(12) United States Patent
Goloubev et al.

(10) Patent No.: US 10,054,107 B2
(45) Date of Patent: Aug. 21, 2018

(54) OMNI-DIRECTIONAL SHAFTLESS WIND TURBINE

(71) Applicants: Mikhail Goloubev, Baltimore, MD (US); Joshua Brown, Bowie, MD (US)

(72) Inventors: Mikhail Goloubev, Baltimore, MD (US); Joshua Brown, Bowie, MD (US)

(73) Assignee: Bowie State University, Bowie, MD (US)

( * ) Notice: Subject to any disclaimer, the term of this patent is extended or adjusted under 35 U.S.C. 154(b) by 0 days.

(21) Appl. No.: 15/173,930

(22) Filed: Jun. 6, 2016

(65) Prior Publication Data
US 2017/0350367 A1 Dec. 7, 2017

(51) Int. Cl.
*F03D 3/06* (2006.01)
*F03D 3/00* (2006.01)

(52) U.S. Cl.
CPC ............ *F03D 3/062* (2013.01); *F03D 3/005* (2013.01); *F05B 2220/706* (2013.01); *F05B 2240/912* (2013.01); *F05B 2280/1021* (2013.01); *F05B 2280/1071* (2013.01)

(58) Field of Classification Search
CPC ..... F03D 3/00; F03D 3/02; F03D 3/04; F03D 9/00; F03D 11/00
USPC ......... 416/203, 24, 126; 290/50, 55; 415/4.4
See application file for complete search history.

(56) References Cited

U.S. PATENT DOCUMENTS

| | | | | |
|---|---|---|---|---|
| 2006/0257240 A1* | 11/2006 | Naskali | .................... | F03D 3/04 415/4.4 |
| 2007/0018464 A1* | 1/2007 | Becker | .................... | F03D 3/02 290/55 |
| 2007/0048137 A1* | 3/2007 | Hartman | .................. | B63H 9/02 416/132 B |
| 2008/0246284 A1* | 10/2008 | Pelman | ................... | F03D 3/005 290/55 |
| 2011/0057452 A1* | 3/2011 | Interlandi | ................ | F03D 3/04 290/55 |

(Continued)

*Primary Examiner* — Albert K Wong (57) ABSTRACT

A present invention describes unique wind turbine assembly in a shape of closed hollow cylinder formed by two sets of three adjustable to positive and negative pitch horizontal blades supported instead of central shaft by three vertical cylindrical blades, which makes this turbine responsive to omni-directional wind. Proposed design concept provides with:

Significant increase of turbine efficiency exceeding 60%, which after coupling this rotor with a generator of 60% efficiency leads to overall wind generator efficiency exceeding 40%.

Low turbine inertia requiring moderate start up winds and reducing turbine vibrations.

Noiseless turbine operation due to its rotation around vertical axis.

Environmental friendliness as low operating speed does not generate strong turbulent air flow capable to challenge birds and bugs existence.

No electronic control of blades angle of attack.

Ease of manufacturing and maintaining together with their reduced cost.

Conducted analysis of the proposed configuration of the wind turbine shows no necessity of additional top support for a personal use wind generator, while requires one for more powerful (community) wind turbines. Proposed additionally supporting turbine tetrahedron beam frame resolves this issue allowing increase of power of such wind generators.

4 Claims, 9 Drawing Sheets

(56) References Cited

U.S. PATENT DOCUMENTS

| | | | | |
|---|---|---|---|---|
| 2011/0061321 A1* | 3/2011 | Phuly | ............... | E02D 27/42 52/297 |
| 2012/0112459 A1* | 5/2012 | Crowe | ............... | F03D 3/061 290/44 |
| 2012/0242087 A1* | 9/2012 | Ruder | ............... | F03D 3/061 290/55 |
| 2013/0170949 A1* | 7/2013 | Samuels | ............... | F03D 9/007 415/1 |
| 2014/0021723 A1* | 1/2014 | Christy | ............... | F03D 9/007 290/55 |
| 2014/0023500 A1* | 1/2014 | Rubio | ............... | F03D 3/005 416/24 |
| 2014/0105743 A1* | 4/2014 | Bassett | ............... | F03D 3/0463 416/126 |
| 2015/0021922 A1* | 1/2015 | Bates | ............... | F03D 3/005 290/55 |
| 2015/0337809 A1* | 11/2015 | Jordan, Sr. | ............... | F03D 3/061 290/50 |
| 2015/0345473 A1* | 12/2015 | Bardia | ............... | F03D 3/005 290/44 |
| 2016/0186725 A1* | 6/2016 | Dofredo | ............... | F03D 9/007 60/641.12 |
| 2017/0096985 A1* | 4/2017 | Bardia | ............... | F03D 9/007 |
| 2017/0138345 A1* | 5/2017 | Bahnmuller | ............... | F03D 7/06 |

* cited by examiner

OMNI-DIRECTIONAL SHAFTLESS WIND TURBINE

| U.S. PATENT DOCUMENTS | | | |
|---|---|---|---|
| 2008/0246284 | August 2008 | Pelman et al. | 290/55 |
| 2014/0021723 | June 2013 | Christy et al. | 290/55 |
| 2015/0021922 | August 2014 | Bates et al. | 290/55 |
| 2015/0337809A1 | August 2015 | Jordan, sr. | N/A |

OTHER PUBLICATIONS

SolidWorks: CAD Application. Bowie State University (BSU), Maryland

Mathematica: 10.3, Computation, Simulation, and Graphing Application. BSU, Maryland

BACKGROUND OF INVENTION

Historically, horizontal axis wind generators have been more popular and, despite being noisy and necessity of blades realignment towards the wind direction and difficulties in maintenance, commonly used in wind farms for a commercial scale energy production as they have proven to be efficient in capturing and converting wind energy. Vertical axis wind generators are silent, but require larger amounts of wind power, do not need any blades repositioning to capture air flow energy, and easy in repairs and services. Presently, increase of wind power production is achieved by enlarging both wind farms and generators which often leads to negative effects:
- air flow through one turbine can interfere with the air flow through the neighboring one sometimes completely blocking it and shutting down this generator;
- increased inertia of wind turbine demands stronger winds available only at greater elevations;
- working gigantic turbines create their own wind with negative environmental effect.

The alternative solution would be replacing centralized wind energy production by numerous local facilities for an individual or small community wind power users. Unfortunately, generation of electric energy for residential use was not promoted as much as solar cells and has not seen significant innovations. The most interesting investigations of various wind turbines are cited in (1) US Pat. No. 2008/0246284A1 in which horizontal C-shaped blades are stacked to form S-shaped rotor attached to central vertical shaft. High inertia of such turbine leads to the requirement of strong horizontal or vertical wind;

(2) US Pat. No. 2014/0021723A1 in which a bunch of small wind generators, attached to horizontal shafts of gradually decreasing length, make overall shape of a tree additionally containing collectors of solar energy. This design could never be used to the maximum of its capacity, complex, and demands electronic control of many blade-shaft pairs;

(3) US Pat. No. 2015/0021922A1 in which vertical three Darrieus blades are attached to top and bottom rings serving as the blades supports and allowing no central shaft. Since operation of such turbine is possible in the horizontal winds only it requires electronic control for turbine positioning;

(4) US Pat. No. 2015/0337809A1 in which barrel shaped rotor consists of numerous curved slanted blades supported by a vertical central shaft mounted inside rectangular frame containing solar panels. Besides being complex and heavy, efficiency of this design, capable of working in strong wind of any direction, is reduced by the presence of central shaft and blocking wind frame.

Against short-comings discussed on above wind turbines, a new design of low cost, non-electronic, small to medium scale production of energy captured from moderate wind of any direction, simple in assembly and maintenance, vibration-reduced, and noiseless omni-directional wind generator is proposed.

SUMMARY OF INVENTION

A present invention describes unique rotor blade assembly suspended with three cylindrical vertical and two sets of three adjustable for the most favorable pitch horizontal radial blades coupled to a generator shaft. As such there is no vertical shaft supporting radial blades, what actually replaces commonly considered interfering with the wind area by the volume of turbine. For maximum increased overall efficiency exceeding 40% in omni-directional winds, turbine dimensions should be such that it axial and radial cross-sectional areas are equal. Due to turbine rotation around vertical axis its precession frequency reduces with the increase of rotational speed and thus, because of the low turbine inertia, eliminates vibrations, as well as makes turbine responsive to low speed winds, noiseless, and environmentally friendly. Simple blades manufacturing and assembly can be further reinforced for more powerful turbines by a supporting tetrahedron beam frame.

BRIEF DESCRIPTION OF THE DRAWINGS

FIG. 1. Two geometries of wind turbine design: shaft containing and shaftless. Presence of central shaft reduces efficiency, while its absence increases it. To obtain efficiency independent of direction areas of rectangular axial and circular radial cross-sections should be the same.

Rotation of such configuration around vertical axis traces same cross-sectional areas for vertical and horizontal cuts, and uniformly absorbs wind energy leading to increased turbine efficiency for any direction of air flow.

Four small holes around I-beam corners serve the purpose of fine alignment of blade's center of mass (CM) with rotational axis.

Simplified versions of tetrahedron cage could be very useful for turbine assembly and protection during transportation.

DETAILED DESCRIPTION

A: Analysis of Wind Turbine Basic Concept

Local, pollutionless and continuous production of electric energy from wind reduces density of power lines and transformer stations, but requires design of a rotor incorporating the best features of horizontal and vertical axis wind turbines such as silent operation, increased efficiency, sensitivity to a wind in any direction, reliability, portability, ease of maintenance, and low cost. Development of such wind turbine leads to the following analysis.

Figure 1:
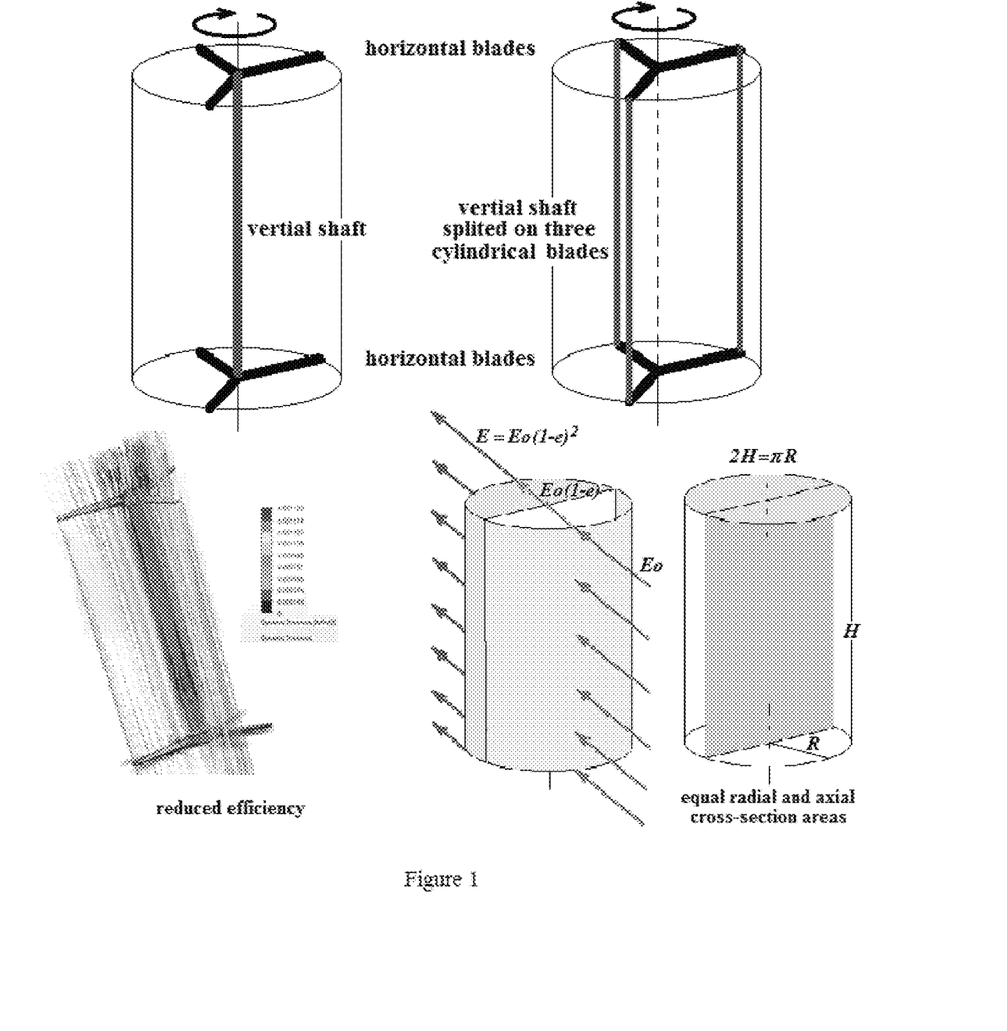

1. In order to be silent turbine should rotate around vertical axis which assumes its simplest shape as cylindrical. That leads to two possible configurations:
   shaft containing when two sets of three horizontal blades in flat circular surfaces are supported by shank cylindrical surface serving as vertical shaft and
   shaftless when cylindrical surface (vertical shaft) is split on vertical blades supporting the same horizontal ones (FIG. 1).
2. Analysis of airflow pressure shows lower efficiency for shaft containing configuration (FIG. 1) and points on the choice of shaftless turbine geometry. In this case a wind generator consisting of two sets of three horizontal blades supported by cylindrical vertical blades becomes responsive to omni-directional wind.
3. For proposed turbine in a horizontal wind carrying energy of density (energy per unit area) Eo air flow gets inside the turbine through half of vertical cylindrical surface and lacking any interference with absent axial shaft moves out trough second half of cylindrical surface with energy density E. Since these surfaces are of equal areas A and contain a rotor of efficiency e, lost wind energy $EA=EoA(1-e)^2$, which defines cylindrical rotor efficiency as $e(2-e)$. Exactly same conclusion applies to vertical wind blowing through two horizontal radial rotors of efficiency e. Energy of the wind in other than horizontal or vertical direction has to be proportional to the squares of horizontal and vertical components of wind velocity; the areas of axial and radial cross-sections; and rotors' efficiency. For uniform response to each component of wind direction turbine has to have equal rectangular axial and circular radial cross-section areas, or $2H=\pi R$, where H and R is turbine height and radius respectively (FIG. 1) as well as equal horizontal and vertical rotor efficiencies which depends on blades configuration and their adjustability.
4. Then, regardless of the wind direction, the power of proposed turbine depends entirely on the wind speed V and can be used to establish basic parameters of wind generator. In case of vertical wind turbine power P can be defined as $$P = g \cdot e \cdot (2-e) \cdot \frac{\pi}{2} \cdot R^2 \cdot \rho \cdot V^3,$$

where g is generator efficiency, and ρ is air density $$\left(\sim 1.225 \frac{kg}{m^3}\right).$$

Turbine with rotor effiency e=0.45, coupled with a good generator of g=0.6, will produce 1 kW of power in a moderate wind of 18 mi/h if the length of its horizontal blades around 60 inches while the height 95 inches.

Figure 2:
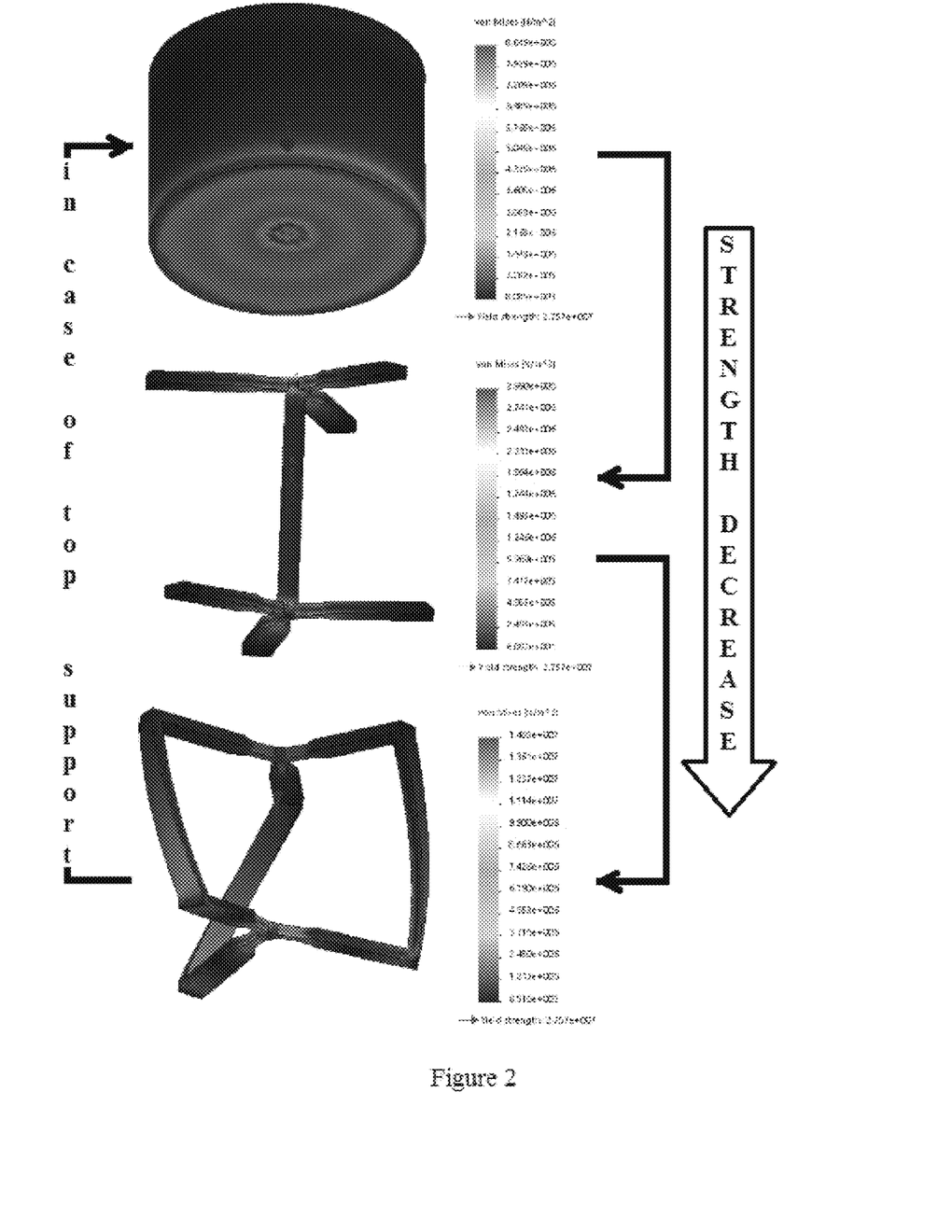
FIG. 2. Conservative Finite Element Analysis of von Mises stresses in: aluminum closed cylinder of recommended radius-to-height ratio together with cut out of it shaft containing and shaftless configurations. Can is the strongest, while shaftless is the weakest even at the most optimum angle of misalignment between top and bottom horizontal blades equal 30°. However, introduction of the top support brings the strength back to the highest level.

5. Preliminary structural analysis of a hollow aluminum can with above dimensions followed by this can modifications to desired turbine geometry showed it to be the weakest with safety factor not less than 2.5 (FIG. 2), which was the highest value when vertical cylindrical blades were coupling top and bottom horizontal blades misaligned by 30°. On the other hand, provided support for the center of the top set of horizontal blades brings the strength of the structure to initial not weakened level. That indicates the necessity of increasing stability and safety of more powerful wind generator by designing a supporting frame not interfering with the wind flow through turbine volume.
6. Due to the specific configuration of vertical cylindrical blades supporting misaligned horizontal pairs, cylindrical rotor can move in one direction only. To keep efficiency of the horizontal rotor on the same level with vertical one, horizontal blades have to be self-adjustable to wind direction, i.e. capable to changing their pitch. Numerical solution of modified Navier-Stokes equations for flow analysis showed the best blades positioning within angle of attack ±8°.

B: Mechanical Design

Mechanical Design conducted through "SolidWorks" and "Mathematica" Applications was aiming 3-D modeling, structural Finite Element (FE), and Computational Fluid Dynamics (CFD) Analysis of a principle, intermediate, and final turbine assembly in order to maximize its efficiency, reduce overall weight (inertia) and manufacturing cost without sacrificing strength, safety, and ease of service.

Figure 3:
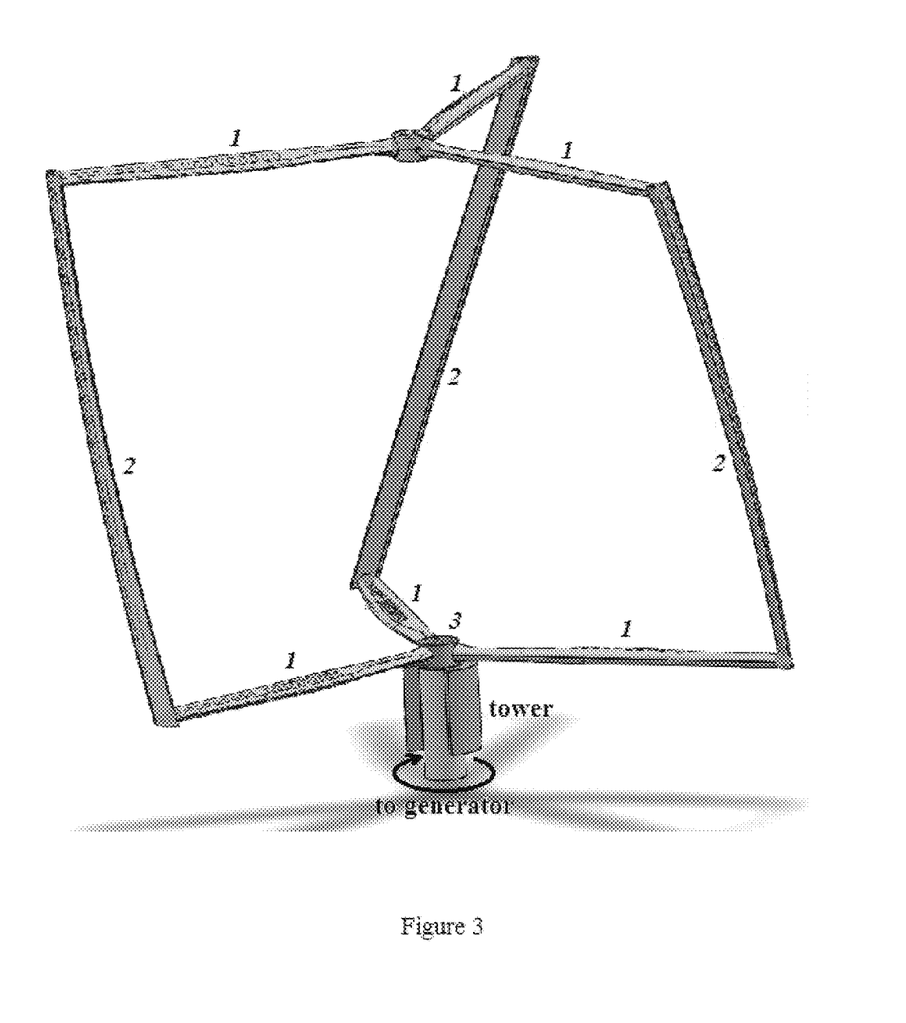
FIG. 3. Full assembly of 1 kW shaftless wind turbine containing two sets of three horizontal blades 1 and slanted 30° with respect to rotational axis of three cylindrical vertical blades 2 all connected together by fixtures 3 described in details in FIG. 6 and FIG. 7.

Presented in FIG. 3 full design assembly for individual use wind turbine contains three major components:

1—six identical horizontal blades;
2—three identical cylindrical vertical blades slanted 30° with respect to rotational axis;
3—providing with proper connections of all blades fixtures.

Figure 4:
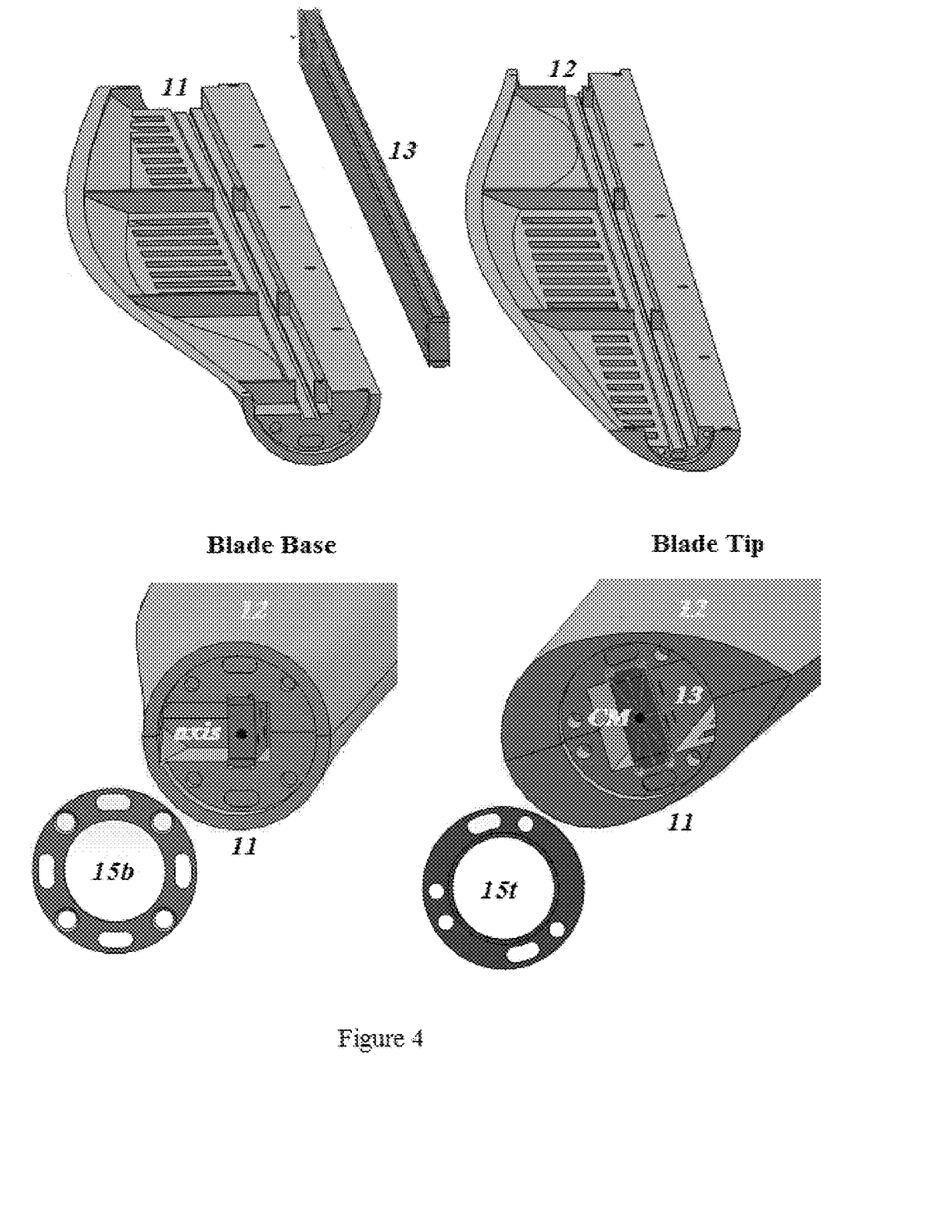
FIG. 4. Design of a horizontal blade contains two aluminum shells 11 and 12 reinforced by stiffness ribs, I-beam 13 and two aluminum blade covers for its base 15b and tip 15t.

Horizontal Blade (FIG. 4)

Figure 6:
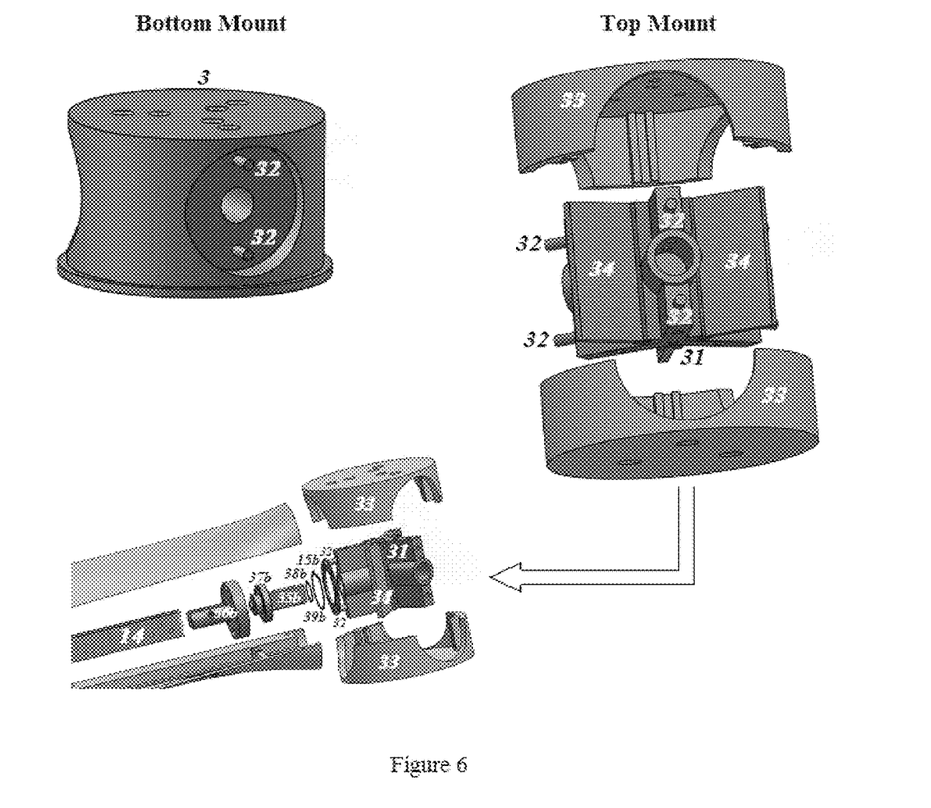
FIG. 6. Identical appearance and functionality, but different composition of steel bottom 3 and aluminum top (31, 33,34) central mounts. Pins 32 limit rotation around blade horizontal axis by ±8°. Components of central attachment are identical to the components of tip attachment and shown in more details in FIG. 7.

Two parts of each horizontal blade are casted aluminum shells (11 and 12) reinforced by stiffness ribs separated by a slot for I-beam: made out of steel (13) for bottom blades, and wood (14) for top blades (FIG. 6). Two blade parts can be properly aligned by the pins fitting into the holes along the edge of thick side of the shell while properly fixed through I-beam and two covers: 15b on the blade base and 15t on the blade tip. These two circular aluminum plates mask precisely blade's base and tip slots and positioning holes. Symmetrical radial cuts on the blade and its covers are for restricting blade rotation by ±8° allowing it automatic adjustment to wind direction. Hence, it is crucial that the center of mass (CM) of assembled blade is positioned on blade's rotational axis. Four small holes at the corners of I-beam serve the purpose of fine alignment blade CM with rotational axis.

Figure 5:
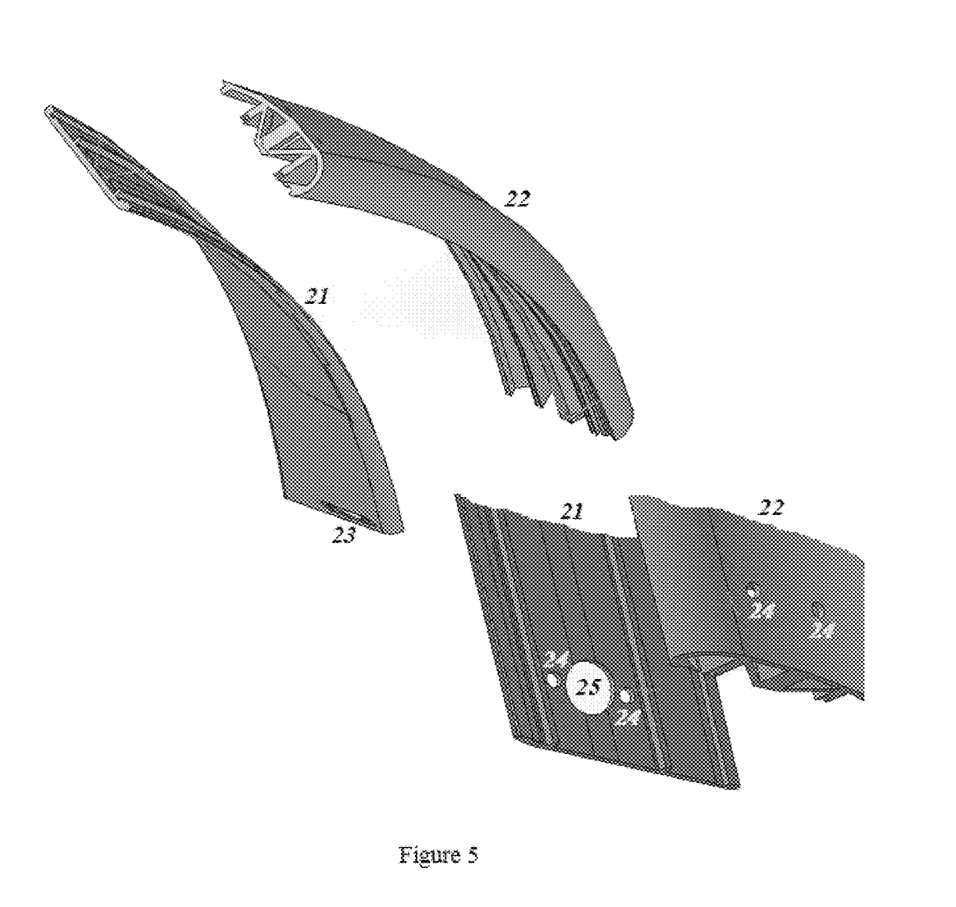
FIG. 5. Similarly to radial (horizontal) blade, vertical blade consists of two stiffened by ribs parts 21 and 22 which are curved along cylindrical surface and slanted 30° with respect to blade vertical axis. It provides, regardless of the wind, with rotation around central axis in one direction only. Functionality of slot 23 together with holes 24 and 25 is illustrated by FIG. 8

Vertical Blade (FIG. 5)

Similarly to horizontal, vertical blade consists of two casted aluminum parts (21 and 22) stiffened by ribs. Both parts are curved along cylindrical surface and slanted 30° with respect to the vertical axis of this surface. Each vertical blade supports two horizontal and contains on both ends holes 25 matching tip shaft 35t (FIG. 7) size together with the slots 23 masking this shaft flange and attachment holes 24. There could be also additional holes for positioning pins limiting horizontal blade rotation around its axis.

Fixtures

Components of fixtures allow proper fastening horizontal blades at their bases in the center and at their tips with vertical blades.

Central Mount (FIG. 6)

Bottom horizontal blades are connected at the center through solid steel cylinder 3 containing three radial cylindrical slots a little greater than diameter of the blade at its base and separated by 120° angle. Each slot has inserted pins restricting unlimited change of blade angle of attack and matching base shaft 35b (FIG. 7) positioning hole. Substantial weight of central bottom mount increases turbine stability by lowing its center of mass.

Top aluminum mount 31 has exactly same features as the bottom one except for lighter weight it Y-shaped, reinforced by three wooden I-beams 34 and enclosed into two casted aluminum covers 33 copying overall shape and size bottom mount.

Figure 7:
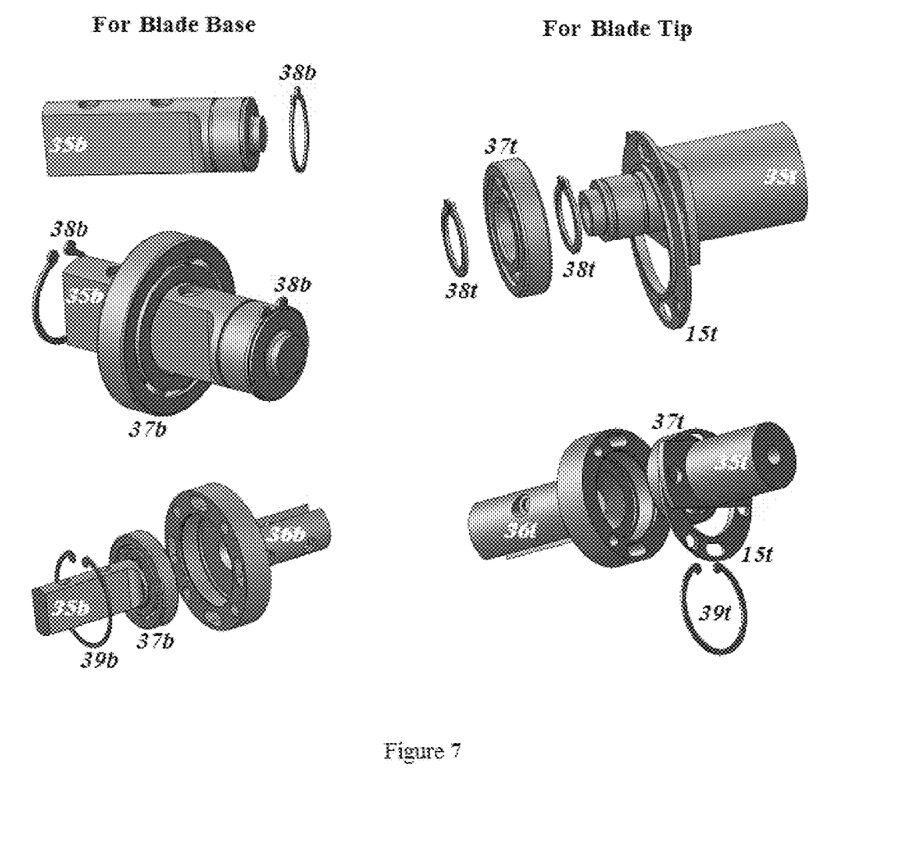
FIG. 7. Different stages of base and tip shafts assemblies containing shafts 35b and 35t; bearings 37b and 37t; bearing housings 36b and 36t; inner 38b, 38t and outer 39b, 39t retaining rings. For proper tip shaft assembly it initially has to hold loose blade tip cover 15t.

Horizontal Blade Shafts (FIG. 7)

Shown in FIG. 6 exploded view of central attachment contains all elements of shaft assembly used for both blade base (b) and blade tip (t) shafts. They may differ in size depending on the blade profile, but have the same components: shafts 35b and 35t to fixed in the central mount and vertical blade; bearings 37b and 37t with their housings 36b and 36t which could be solidly connected to each end of I-beam; outer (shaft) retaining rings 38b and 38t; inner (housing) retaining rings 39b and 39t.

Assemblies of the shafts are performed in similar steps with the only difference that tip shaft 35t should initially contain loose blade tip cover 15t as shown in FIG. 7 illustrating procedure sequences:

Inserting outer retaining ring (38b or 38t) into shaft (35b or 35t) groove;
Placing bearing (37b or 37t) on the shaft;
Fixing bearing inner raceway by second outer retaining ring (38b or 38t);
Inserting bearing with shaft into housing (36b or 36t);
Fixing bearing with shaft in the housing by inner retaining ring (39b or 39t)

Bearing allows rotation of the housing which mounting slots for the I-beam and holes for attachments to blade base and tip which replicate blade covers.

Figure 8:
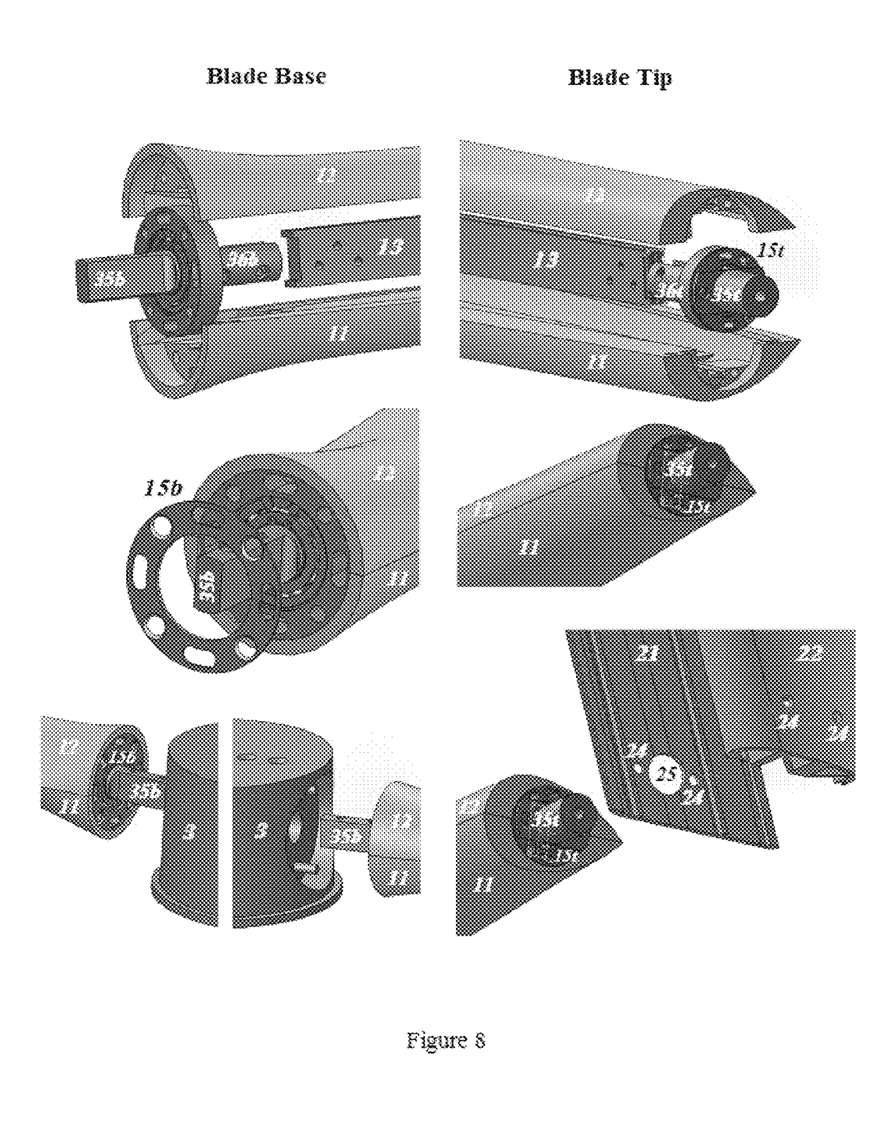
FIG. 8. Major stages of complete horizontal blades and turbine assemblies.

Complete Assembly of Horizontal Blade (FIG. 8)

After base and tip shafts are attached to I-beam, two parts of horizontal blade (11 and 12) can be aligned and joined together wrapping up I-beam and both housings. Blade assembly will be finished when both blade parts are attached to I-beam, while blade base and tip covers and corresponding to them housing are connected to the blade. Fully assembled horizontal blade has to be capable of rotating about two exposed shafts.

Turbine Assembly (FIG. 8)

Figure 9:
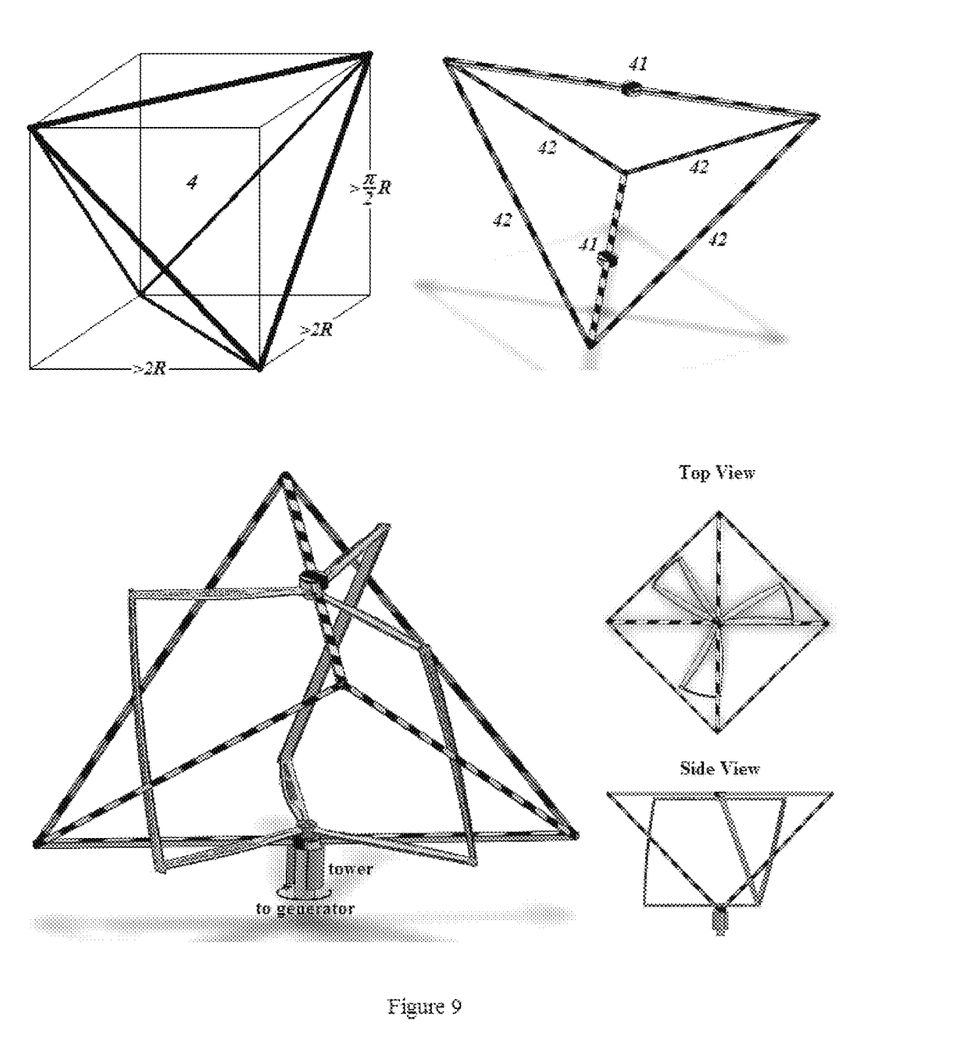
FIG. 9. Concept of supporting tetrahedron cage 4 and full nine blade configuration suspended in this beam cage. Top cage beam 41 is attached through the bearing to the top central mount while bottom cage beam 41 is part of the tower. Top and bottom beams 41 are supported by not interfering with turbine beams 42. Double support of turbine reduces loads on the generator shaft, while minimal beams interaction with the wind cannot significantly decrease wind generator efficiency. Cage strength and stability allow it size increase leading to the higher turbine productivity.

Horizontal blade base shafts 35b fit into central mounts holes where they are fixed. Pins 32 of central mounts are adopted by radial slots in both blade base cover 15b and bearing housing 36b restraining blade rotation by ±8°. Insertion of any three horizontal blades into top central mount 31 and another three into bottom mount 3 completes assembly of two horizontal rotors which have to be linked by three vertical blades. Horizontal blade connection to vertical involves fitting horizontal blade tip shaft 35t into vertical blade hole 25 and fixing it position through shaft flange holes matching vertical blade holes 24. In case part 21 of vertical blade contains pins 32 they should penetrate aligned radial slots of horizontal blade tip cover 15t and bearing housing 36t. Despite simplicity of such procedures, attachment of one horizontal blade to vertical ends by vertical blade complete assembly supposed to support not one but two horizontal blades at their tips. Requirement of simultaneous connection to vertical blade two horizontal blades belonging to top and bottom rotors leads to introduction assisting, protecting, and supporting final turbine assembly cage (FIG. 9). Proposed Tetrahedron Cage 4 is built out of six beams which are diagonals of six parallelepiped faces loosely enclosing cylindrically shaped turbine. Top and bottom faces are squares with the side a little greater than 2R, where R is the outer radius of horizontal turbine cut, while side faces are rectangles width of square side and height a little exceeding the turbine's one $H=\lambda R/2$. The length of two beams 41 supporting turbine top and bottom is insignificantly greater than $2\sqrt{2}R$, while the lengths of four side beams 42 supporting beams 41 a little greater than $\sqrt{\pi^2+16}\, R/2$. In general, the optimum length ratio of beams 41 to 42 is $4\sqrt{2}/\sqrt{\pi^2+16}=1.11$. Beams profile, their material and working lengths should be defined separately for every specific wind generator. Tetrahedron cage is open in all directions, but protects enclosed in it device, which makes it convenient for turbine assembly and transportation. In case such strong and stable cage is permanently incorporated with the wind turbine it will reduce the loads on the generator and horizontal blades shaft bearing(s) and will not decrease turbine efficiency by blocking the winds. This will allow increase the size of both the cage and suspended in it wind generator resulting in higher turbine productivity.

The invention claimed is:
1. A shaftless omni-directional wind turbine inside a cage comprising:
   a rotor having:
      an upper subassembly containing a set of three horizontal blades attached at their base to an upper pivot central mount and extending radially at equal angular spacing;

a lower subassembly containing a set of three horizontal blades attached at their base to a lower pivot central mount and extending radially at equal angular spacing; and a set of three vertical blades wherein a first end of each vertical blade is attached to the tips of the corresponding horizontal blades of the upper subassembly and the second end of each vertical blade is attached to the tips of the corresponding horizontal blades of the lower subassembly; and a tetrahedral cage:

formed of six connected beams wherein the center of one beam of said cage is pivotally attached to the upper pivot central mount and the center of the opposing beam of the tetrahedron cage is pivotally attached to the lower pivot central mount wherein the tetrahedron cage is sized to allow the rotor to freely rotate when pivotally connected to the said cage.

2. The shaftless omni-directional wind turbine of claim 1, wherein each horizontal blade of said upper and lower rotor subassemblies is attached to a rotating mount to permit restrained rotation up to ±8° around its own axis to automatically adjust the pitch of each blade to wind direction.

3. The shaftless omni-directional wind turbine of claim 2, wherein each vertical blade of said rotor assembly consists of two halves stiffened by inside ribs and bulged along a cylindrical surface with a radius-to-height ratio equal 111:100 while additionally twisted at substantially a 30° angle with respect to the turbine's rotational axis.

4. The shaftless omni-directional wind turbine of claim 1, further including a generator coupled to the rotor.

* * * * *